Figure 1:
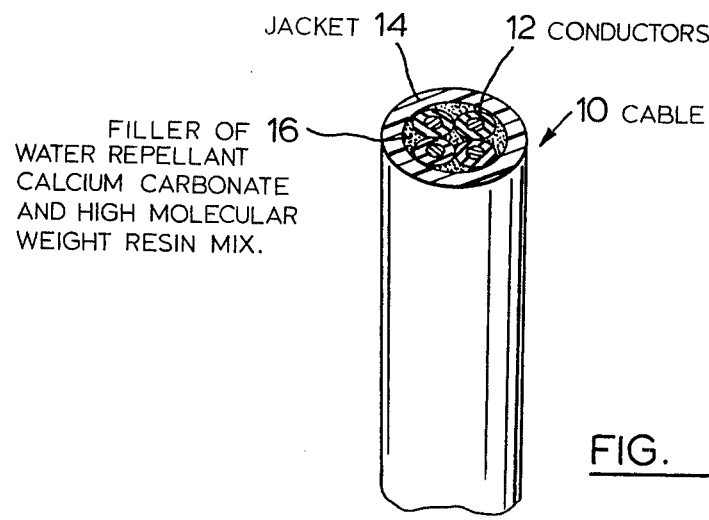

United States Patent [19]

Woytiuk

[11] 4,002,819
[45] Jan. 11, 1977

[54] WATER BLOCKED ELECTRIC CABLES
[75] Inventor: Leo Victor Woytiuk, Pointe-Claire, Canada
[73] Assignee: Northern Electric Company Limited, Montreal, Canada
[22] Filed: June 14, 1976
[21] Appl. No.: 695,845
[52] U.S. Cl. .............................. 174/23 C; 174/107
[51] Int. Cl.² ......................................... H01B 7/28
[58] Field of Search ............. 174/23 R, 23 C, 116, 174/110 SR, 107; 252/72; 106/33

[56] References Cited
UNITED STATES PATENTS

| 3,538,235 | 11/1970 | Arendt et al. | 174/23 C |
| 3,711,621 | 1/1973 | Jachimowicz | 174/23 R |
| 3,803,339 | 4/1974 | Speekman | 174/23 C |
| 3,903,013 | 9/1975 | Foord et al. | 174/23 C X |
| 3,915,888 | 10/1975 | Hoeppel | 174/23 C X |

FOREIGN PATENTS OR APPLICATIONS

| 2,006,359 | 8/1971 | Germany | 174/23 C |
| 2,007,163 | 9/1971 | Germany | 174/23 R |
| 2,257,133 | 5/1974 | Germany | 174/23 R |
| 1,116,175 | 6/1968 | United Kingdom | 174/23 R |

Primary Examiner—Arthur T. Grimley

[57] ABSTRACT

An electric cable having a multi-stranded core of insulated conductors and a jacket, in which the spaces between and around the conductors are at least partially filled with a mixture which forms a blockage to the penetration of water. The mixture comprises water repellant treated calcium carbonate and high molecular weight polyacrylamide resin which do not react with each other or when in contact with water. Preferably the individual conductors are coated with a hydrophobic liquid such as a low viscosity paraffinic oil.

10 Claims, 2 Drawing Figures

WATER BLOCKED ELECTRIC CABLES

This invention relates to electric cables protected against the entry and migration of water.

Cables for use underground where water is present in the environment are now manufactured by filling the interstices between and around the conductors with a jelly or greaselike material to protect the polyolefin insulated conductors against contact with water entering the cable and to prevent any water which does come into contact with a conductor from excessively migrating along the conductor. For effective water blockage such a cable must be filled almost 100% which requires a large amount of filler material. Also, the jelly or greaselike material is difficult to remove from the conductors during splicing and terminating the cable. It is often necessary to apply the filling compound hot and this tends to degrade the insulation on each conductor. The jelly or grease like material also sometimes imparts stiffness to the cable which hampers installation, especially at low temperatures. A further disadvantage is that such materials are flammable.

It has been proposed to replace the jelly or greaselike material with a powder filling which will react with water to form water blockage materials. An example is disclosed in U.S. Pat. No. 3,538,235 issued Nov. 3, 1970 to Ilse Arendt et al assignors to Siemens AG. However, the powder mixture of the Arendt cable swells on contact with water and alters the mutual capacitance of the cable to an inacceptable degree. If a lower concentration of powder mixture is used the swelling of the resin by itself is not sufficient for adequate water blockage.

Another example of a powder filling which swells on contact with water is disclosed in U.S. Pat. No. 3,803,339 issued Apr. 9, 1974 to Speekman where the interaction of the water with the powder also generates a gas which urges the expanded polymeric material into the voids within the sheath of the cable. Here again the composition and the configuration of the core are altered, which adversely affects the mutual capacitance of the core. More specifically the generation of a gas releases electrolytic ions which adversely changes the specific inductive capacity of the separating medium while swelling and gas pressure changes the geometric configuration of the core. Also, the gas-evolving materials may contain allergenic, toxic and hazardous components or they may produce hazardous and objectionable by-products. In German Patent No. 2,007,163 dated Sept. 2, 1971 it has been suggested that polyvinyl alcohol or polyacrylamide could be used as a swelling agent but certain of those synthetic resins do not swell rapidly enough in cold water to effect a satisfactory water block where the core is only partially filled with a powdered water blocking agent. Since synthetic resins of this type are expensive, it would be uneconomical to pack a cable core fully with such materials.

The present invention overcomes these disadvantages by providing an electric cable partially filled with a powder material which will block the ingress of water at low temperatures (i.e. ground temperatures). The invention further provides an electric cable having a filler which is nonflammable, non-allergenic and non-toxic and which does not produce deleterious by-products when heated.

In its broadest aspect the invention consists of an electric cable having a core of a plurality of insulated conductors and a jacket, the interstices between the conductors and within the jacket being at least partially filled with a mixture of water repellant treated calcium carbonate and at least one high molecular weight resin rapidly hydratable to form a viscous solution. Preferably the conductors are each coated with a hydrophobic liquid.

Figure 2:
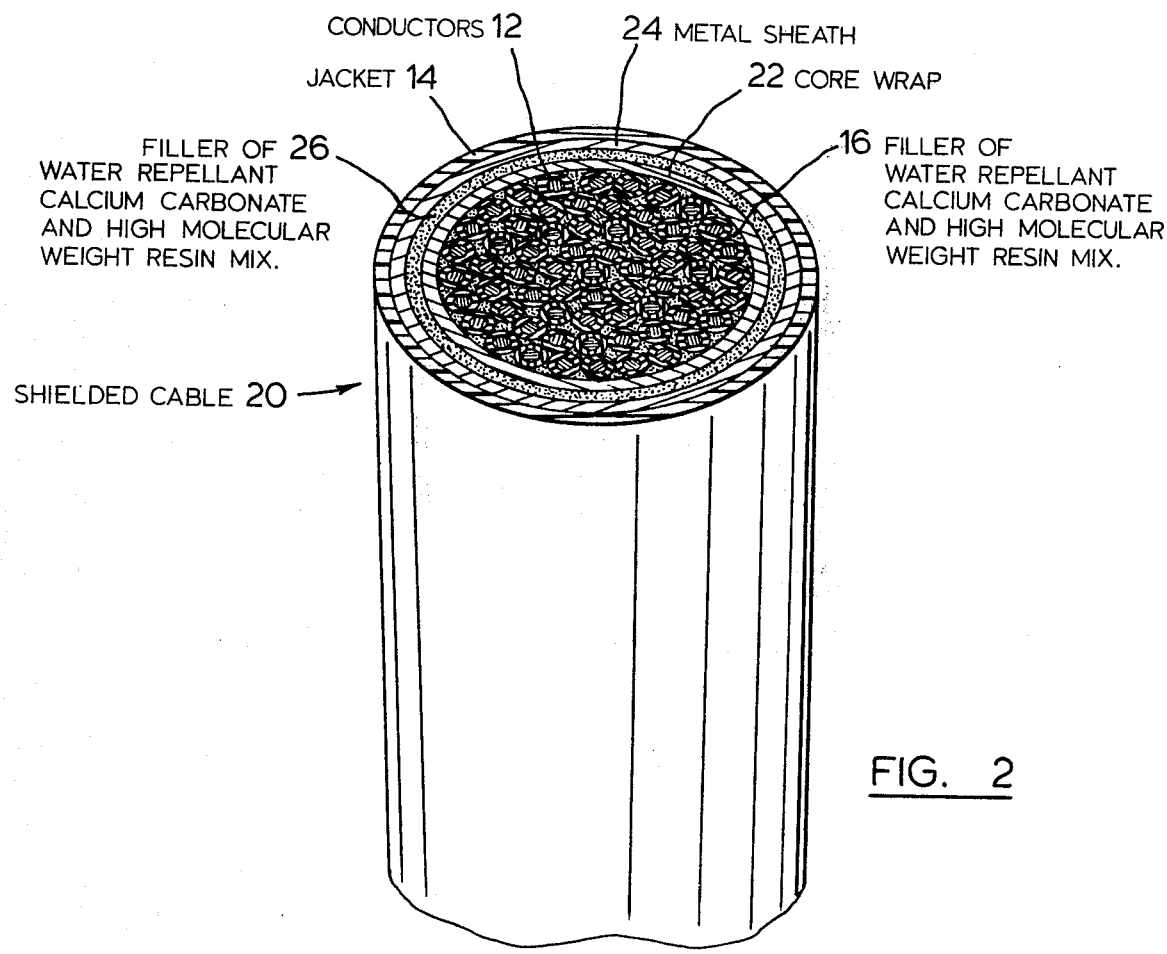

Example embodiments of the invention are shown in the accompanying drawings in which:

FIG. 1 shows a multi-stranded, jacketed electric cable filled according to the invention; and FIG. 2 shows a multi-stranded, sheathed and jacketed electric cable filled according to the invention.

The example embodiment of FIG. 1 shows a cable 10 comprising a plurality of insulated conductors 12 stranded together to form a core enclosed in a jacket 14 of polyethylene or other material. The interstices between conductors 12 and jacket 14, and between the conductors themselves, contain a filler 16 comprising a mixture of a hydrophobic powder in the form of water repellant treated calcium carbonate and a hydrophilic powder in the form of at least one high molecular weight resin rapidly hydratable to form a viscous solution. Preferably the hydrophobic powder is a long chain fatty acid coated calcium carbonate such as that sold under the trade mark "Protaxulate" or "Protex E" by Pluess-Stauffer A.G. of France, and the hydrophilic powder is a high molecular weight polyacrylamide such as that sold under the trade mark "Separan" by Dow Chemical Corporation or "Magnifloc" by the Cyanmid Company. It should be noted that the manufacturers of such hydrophilic powders specify compacting to achieve water blockage but it will be appreciated that tamping of the core filler in the production of a continuous cable would be very difficult to achieve.

The percentage composition of filler 16 should be between 95% and 70% by weight of the hydrophobic powder and between 5% and 30% by weight of the hydrophilic powder, depending upon the electrical characteristics required of cable 10. The more critical the electrical transmission requirements, the lower will be the percentage by weight of the hydrophilic powder. For instance a telephone cable would require a minimum amount of the hydrophilic powder, i.e. 5%.

Using filler 16 of the invention it is not necessary to substantially fill the voids in claim 10. It has been found that in certain instances cable 10 will be water blocked when filled only 33% by volume, because of the nature of the reaction of filler 16 to the ingress of water into the core of the cable. When such ingress occurs in sufficient quantity to break down the surface tension of the coated calcium carbonate the polyacrylamide will dissolve rapidly in the water to increase the viscosity of the water. The solution will travel only a short distance along the cable core, depending on the percentage by volume of the filler present in the core and the pressure of the water itself.

To aid in the production of the filled cable core, and to inhibit the powders of filler 16 from falling out when cable 10 is cut, it is advantageous to wet the surfaces of the insulation of conductors 12 with a hydrophobic liquid which will not produce adverse characteristics to the cable such as stress cracking in a polyethylene jacket. A low viscosity paraffinic oil would be suitable for the purpose preferably with a high analine point.

In the embodiment shown in FIG. 2 of the drawings a shielded cable 20 is formed by applying a core wrap 22 and then a metal sheath 24 between conductors 12 and jacket 14. Before applying core wrap 22, filler 16 is introduced to occupy the voids between conductors 12 as before. After core wrap 22 has been applied a further amount of the same mixture of hydrophobic powder and hydrophilic powder is applied with metal sheath 24 to form a layer 26 interposed between the core wrap and the sheath.

In specific tests three different telecommunications cables consisting of 25 pairs of 19 gauge insulated conductors were filled in the interstices with varying amounts of powder comprising 80% by weight of water repellant treated calcium carbonate and 20% by weight of high molecular weight polyacrylamide resin. The resultant cables had the following characteristics:

| Desired Nominal Level | | Test Results | | |
| --- | --- | --- | --- | --- |
| | | (1) | (2) | (3) |
| Filling by bulk density | 60% | 55 | 57 | 67 |
| Average water flow in core after 22 days with 3' head of water | 35 inches max. | 14 | 26 | 17 |
| Average mutual capacitance | 0.083±0.005 | 0.080 | 0.079 | 0.079 |

I claim:

1. An electric cable having a core of a plurality of insulated conductors and a jacket, the interstices between the conductors and within the jacket being at least partially filled with a mixture of water repellant treated calcium carbonate and at least one high molecular weight resin rapidly hydratable to form a viscous solution.

2. A cable as claimed in claim 1 in which the calcium carbonate is surface coated with a water repellant long chain fatty acid or modified fatty acid selected from the group consisting of lauric acid, myristic acid, palmitic acid, stearic acid and arachidic acid.

3. A cable as claimed in claim 1 in which the resin is an anionic polyacrylamide resin with an average molecular weight between $2.5 \times 10^6$ and $7 \times 10^6$ and with between 12% and 28% acrylamide groupings which have been chemically converted to acrylic acid groupings.

4. A cable as claimed in claim 1 in which the resin is a polyacrylamide resin which has been crosslinked by irradiation.

5. A cable as claimed in claim 1 in which the resin is irradiated cross-linked polyethylene oxide.

6. A cable as claimed in claim 1 in which the resin is a hydrolized starch graft polymer of polyacrylonitrile.

7. A cable as claimed in claim 1 in which the mixture fills between 30% and 95% of the total volume of the interstices.

8. A cable as claimed in claim 1 including a core wrap and a metal sheath located between the conductors and the jacket, the mixture being also interposed between the core wrap and the metal sheath.

9. A cable as claimed in claim 1 in which the conductors are each coated with a hydrophobic liquid.

10. A cable as claimed in claim 9 in which the hydrophobic liquid is a low viscosity paraffinic oil.

* * * * *